US008693436B2

(12) United States Patent
Aoyagi

(10) Patent No.: US 8,693,436 B2
(45) Date of Patent: Apr. 8, 2014

(54) MOBILE STATION AND CAMPING-ON METHOD

(75) Inventor: Kenichiro Aoyagi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 107 days.

(21) Appl. No.: 13/054,313

(22) PCT Filed: Jul. 15, 2009

(86) PCT No.: PCT/JP2009/062814
§ 371 (c)(1),
(2), (4) Date: Apr. 8, 2011

(87) PCT Pub. No.: WO2010/008022
PCT Pub. Date: Jan. 21, 2010

(65) Prior Publication Data
US 2011/0182239 A1 Jul. 28, 2011

(30) Foreign Application Priority Data
Jul. 15, 2008 (JP) ................................. 2008-184343

(51) Int. Cl.
*H04W 4/02* (2009.01)
(52) U.S. Cl.
USPC .......................................................... 370/331
(58) Field of Classification Search
None
See application file for complete search history.

(56) References Cited

U.S. PATENT DOCUMENTS

| | | | | |
|---|---|---|---|---|
| 5,887,260 A | * | 3/1999 | Nakata | 455/436 |
| 6,493,561 B1 | | 12/2002 | Hasegawa | |
| 2002/0105913 A1 | | 8/2002 | Miya | |
| 2008/0132239 A1 | * | 6/2008 | Khetawat et al. | 455/438 |
| 2008/0293419 A1 | * | 11/2008 | Somasundaram et al. | 455/437 |
| 2009/0196266 A1 | * | 8/2009 | Wu et al. | 370/338 |
| 2010/0029283 A1 | * | 2/2010 | Iwamura | 455/437 |
| 2010/0130197 A1 | * | 5/2010 | Wu | 455/433 |
| 2010/0323663 A1 | * | 12/2010 | Vikberg et al. | 455/410 |

FOREIGN PATENT DOCUMENTS

| | | |
|---|---|---|
| CN | 1383696 A | 12/2002 |
| JP | 09 084095 | 3/1997 |
| JP | 10 13908 | 1/1998 |
| JP | 2001 197537 | 7/2001 |
| JP | 2002 532989 | 10/2002 |
| WO | 2008 081816 | 7/2008 |
| WO | WO-2008/081816 | * 7/2008 |

OTHER PUBLICATIONS

International Search Report Issued Oct. 27, 2009 in PCT/JP09/062814 filed Jul. 15, 2009.
Office Action issued Feb. 22, 2013 in Chinese Patent Application No. 200980128020.4 with English language translation.

(Continued)

*Primary Examiner* — Chirag Shah
*Assistant Examiner* — Rina Pancholi
(74) *Attorney, Agent, or Firm* — Oblon, Spivak, McClelland, Maier & Neustadt, L.L.P.

(57) ABSTRACT

A mobile station UE includes a manager configured to manage a macro cell and a home cell in association with each other, the mobile station being authorized to access the home cell, and a camping-on processor configured to determine, when receiving a broadcast information from the macro cell, whether to start performing camp-on in the home cell or not according to a comparison result between a radio quality of the home cell which is managed in association with the macro cell and a radio quality in a camping-on cell.

9 Claims, 6 Drawing Sheets

(56) References Cited

OTHER PUBLICATIONS

Office Action issued Mar. 5, 2013 in Japanese Patent Application No. 2010-520882 with English language translation.

Office Action issued Dec. 4, 2012 in Japanese Application No. 2010-520882 (With English Translation).

Office Action issued Jul. 29, 2013 in Chinese Patent Application No. 200980128020.4 (with English language translation).

* cited by examiner

| HOME CELL | PARENT MACRO CELL |
|---|---|
| #a | #A |
| ⋮ | ⋮ |

MOBILE STATION AND CAMPING-ON METHOD

TECHNICAL FIELD

The present invention relates to a mobile station and a camp-on method.

BACKGROUND ART

A mobile communication system is known in which macro cells #A to #G belonging to the same location registration area LA#α are installed, and a home cell #a which a mobile station UE is authorized to access is installed in the macro cell #A, as shown in FIG. 1. Herein, it is assumed that a frequency #f1 is used in the macro cells #A to #G, and a frequency #f2 is used in the home cell #a.

In such a mobile communication system, the mobile station UE needs to perform processing of location registration to the home cell #a in order to perform camp-on in the home cell #a.

Also, in order to change its camping-on cell, the mobile station UE needs to compare the radio quality of the current cell with the radio quality in neighboring cells based on information which is included in broadcast information and indicates the neighboring cells.

SUMMARY OF THE INVENTION

Problems to be Solved by the Invention

Normally, the mobile station UE is configured to perform location registration processing (attachment processing) in cases such as where a power supply is turned on, where the mobile station UE enters a new location registration area, and where a period timer expires.

The mobile station UE, however, performs no location registration processing (attachment processing) for a while to reduce redundant power consumption of the mobile station UE, in some cases such as where the mobile station UE changes the camping-on cell to another in the same location registration area, and where a period timer is being in operation. Thus, there is a problem in that even when the mobile station UE comes close to the home cell #a, the mobile station UE is likely to remain camping-on in the macro cell #A, and thus may start performing camp-on in the home cell #a with a delay.

It is possible to cause the mobile station UE to detect the home cell #a by notifying the information which indicates the neighboring cells of each macro cell by using broadcast information. In the case where many home cells are present, however, an information amount of the broadcast information is so large that there occurs a problem of an increase in time required for cell search processing by the mobile station UE.

This also involves a problem that even a mobile station UE which is not authorized to access the home cell #a searches for the home cell #a in the same manner.

Further, in the location registration processing, the mobile station UE may be instructed to measure the radio quality of a home cell which the mobile station UE is authorized to access. This, however, involves a problem of an increase in power consumption of the mobile station UE due to redundant measurement processing of different frequency because the mobile station UE cannot measure the radio quality in the home cell #a while being in the macro cells #B to #F.

The present invention has been made in view of the above-described problems, and it is an objective of the invention is to provide a mobile station and a camping-on method which are capable of performing camp-on in a home cell efficiently, while reducing the power consumption.

Means for Solving the Problem

The first feature of the present invention is summarized in that a mobile station including a manager configured to manage a macro cell and a home cell in association with each other, the mobile station being authorized to access the home cell, and a camp-on processor configured to determine, when receiving a broadcast information from the macro cell, whether to start performing camp-on in the home dell or not according to a comparison result between a radio quality of the home cell which is managed in association with the macro cell and a radio quality in a camping-on cell.

In the first feature of the present invention, the camp-on processor may be configured to start performing campon in the home cell in a case where a sum of an offset value included in the received broadcast information and the radio quality of the home cell exceeds the radio quality in the macro cell.

In the first feature of the present invention, the manager may manage the macro cell and the home cell in association with each other based on information notified by a network apparatus at a time of location registration processing or call connection processing.

In the first feature of the present invention, the camp-on processor may start searching for and performing camp-on in the home cell in a case where the mobile station is notified of a primary scrambling code, a PCI, or a frequency for the home cell by the broadcast information from the macro cell.

The second feature of the present invention is summarized in that a camping-on method in a mobile station including a step A of measuring, by the mobile station, a radio quality of a home cell which is managed in association with a macro cell, when the mobile station receives broadcast information from the macro cell, and a step B of determining, by the mobile station, whether to start performing camp-on in the home cell or not according to a comparison result between the measured radio quality of the home cell and a radio quality of a camping-on cell.

In the second feature of the present invention, in the step B, the mobile station may start performing camp-on in the home cell in a case where a sum of an offset value included in the received broadcast information and the radio quality in the home cell exceeds the radio quality of the macro cell.

In the second feature of the present invention, the camping-on method may include a step of managing the macro cell and the home cell in association with each other by the mobile station based on information notified by a network apparatus at a time of location registration processing or call connection processing.

In the second feature of the present invention, the camping-on method may include a step of starting searching for and performing camp-on in the home cell by the mobile station in a case where the mobile station is notified of a primary scrambling code, a PCI, or a frequency for the home cell by the broadcast information from the macro cell.

Effects of the Invention

As described above, the present invention can provide a mobile station and a camping-on method which are capable of performing camp-on in a home cell efficiently, while reducing the power consumption.

MODE FOR CARRYING OUT THE INVENTION (Configuration of Mobile Communication System according to First Embodiment of Present Invention)

A configuration of a mobile communication system according to the first embodiment of the present invention is described with reference to FIGS. 1 to 9.

Figure 1:
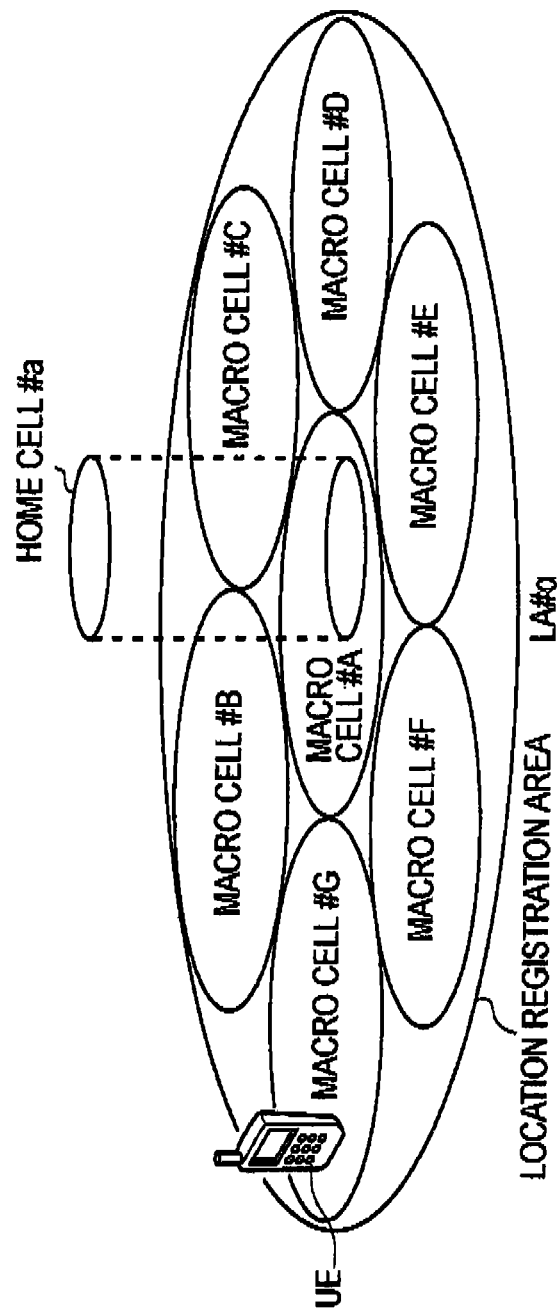
FIG. 1 is a configuration diagram of a mobile communication system according to a first embodiment of the present invention.

As shown in FIG. 1, as the mobile communication system according to the present embodiment, known is a mobile communication system in which macro cells #A to #G belonging to the same location registration area LA#α are installed, and in which a home cell #a which a mobile station UE is authorized to access is installed in the macro cell #A. Herein, it is assumed that a frequency #f1 is used in the macro cells 11A to #G, and a frequency #f2 is used in the home cell #a.

The mobile communication system according to the present embodiment may be a mobile communication system to which the W-CDMA system is applied, or a mobile communication system to which the LTE (Long Term Evolution) system is applied.

Figure 2:
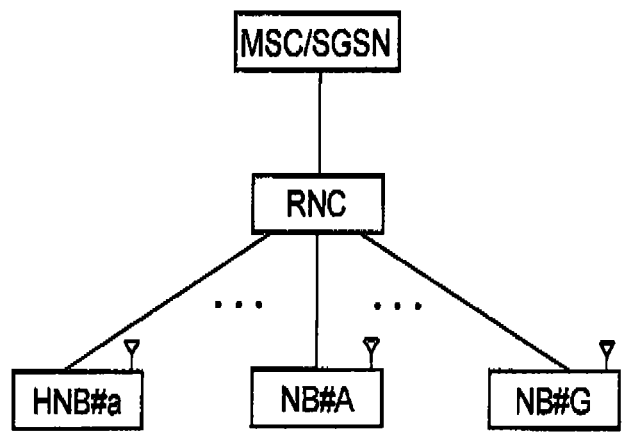
FIG. 2 is a diagram showing an example of an overall configuration of the mobile communication system according to the first embodiment of the present invention.

For example, in the case where the mobile communication system according to the present embodiment is a mobile communication system to which the W-CDMA system is applied, the mobile communication system may be configured as follows. Specifically, as shown in FIG. 2, a radio base station HNB#a which manages the home cell #a, and radio base stations NE#A to NB#G which respectively manage the macro cells #A to #G are accommodated in one or more radio circuit control stations RNC, and the one or more radio circuit control stations RNC are accommodated in one or more exchanges MSC/SGSN.

Figure 3:
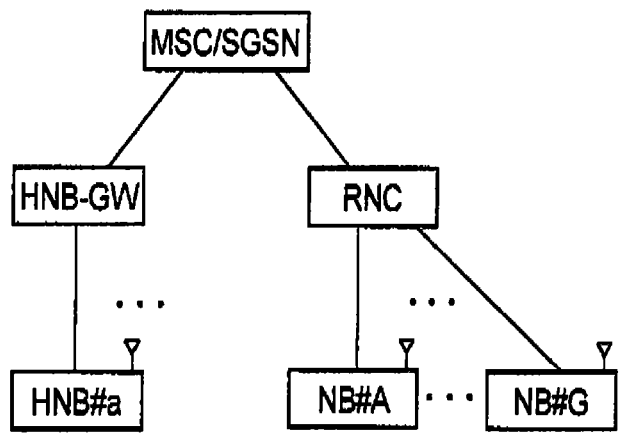
FIG. 3 is a diagram showing an example of an overall configuration of the mobile communication system according to the first embodiment of the present invention.

In addition, in the case where the mobile communication system according to the present embodiment is a mobile communication system to which the W-CDMA system is applied, the mobile communication system may be configured as follows. Specifically, as shown in FIG. 3, a radio base station HNB#a which manages the home cell #a is accommodated in an aggregation device HNB-GW, radio base stations NB#A to NB#G which respectively manage the macro cells #A to #G are accommodated in one or more radio circuit control stations RNC, and the one or more radio circuit control stations RNC and the aggregation device HNB-GW are accommodated in one or more exchanges MSC/SGSN.

Figure 4:
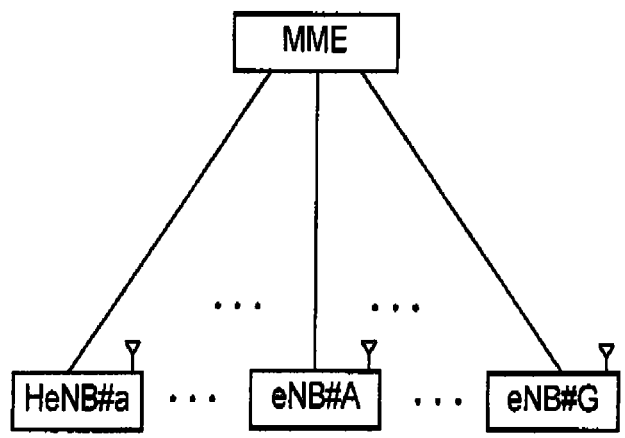
FIG. 4 is a diagram showing an example of an overall configuration of the mobile communication system according to the first embodiment of the present invention.

Furthermore, in the case where the mobile communication system according to the present embodiment is a mobile communication system to which the LTE system is applied, the mobile communication system may be configured as follows Specifically, as shown in FIG. 4, a radio base station HeNB#a which manages the home cell #a, and radio base stations eNB#A to eNB#G which respectively manage the macro cells #A to #G are accommodated in one or more exchanges MME.

Figure 5:
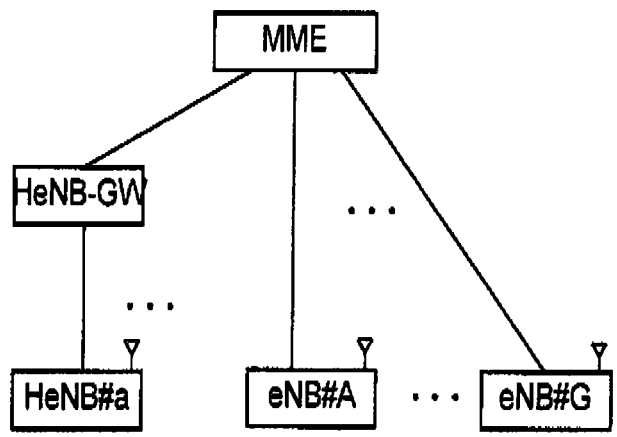
FIG. 5 is a diagram showing an example of an overall configuration of the mobile communication system according to the first embodiment of the present invention.

In addition, in the case where the mobile communication system according to the present embodiment is a mobile communication system to which the LTE system is applied, the mobile communication system may be configured as follows. Specifically, as shown in FIG. 5, a radio base station HeNB#a which manages the home cell #a is accommodated in an aggregation device HeNB-GW, and the aggregation device HeNB-GW and radio base stations eNB#A to eNB#G which respectively manage the macro cells #A to #G are accommodated in one or more exchanges MME.

Figure 6:
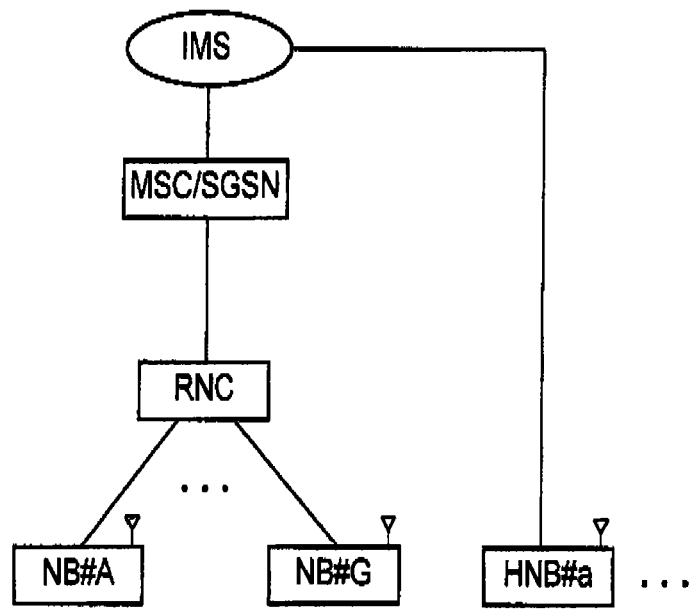
FIG. 6 is a diagram showing an example of an overall configuration of the mobile communication system according to the first embodiment of the present invention.

Moreover, in the case where the mobile communication system according to the present embodiment is a mobile communication system to which the W-CDMA system is applied, the mobile communication system may be configured as follows. Specifically, as shown in FIG. 6, radio base stations NB#A to NB#G which respectively manage the macro cells #A, to #G are accommodated in one or more radio circuit control stations RNC, the one or more radio circuit control stations RNC are accommodated in one or more exchanges MSC/SGSN, and the one or more exchanges MSC/SGSN and a radio base station HNB#a which manages the home cell #a are accommodated in an IMS (IP Multimedia Subsystem).

Figure 7:
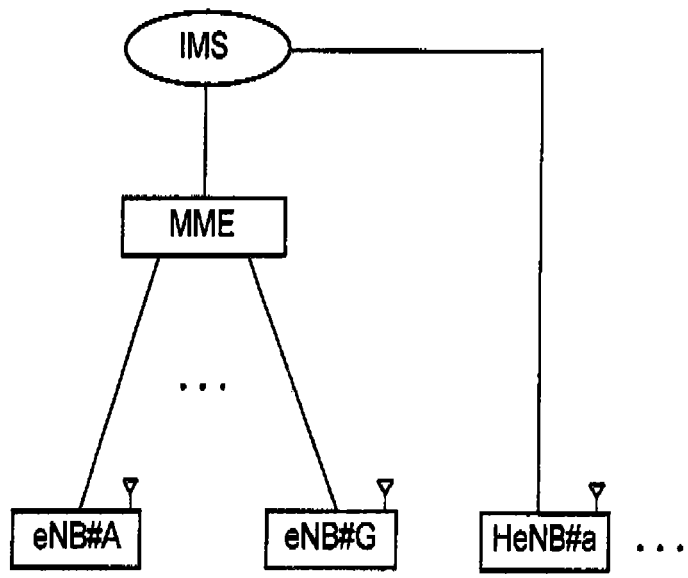
FIG. 7 is a diagram showing an example of an overall configuration of the mobile communication system according to the first embodiment of the present invention.

Additionally, in the case where the mobile communication system according to the present embodiment is a mobile communication system to which the LTE system is applied, the mobile communication system may be configured as follows. Specifically, as shown in FIG. 7, radio base stations eNB#A to eNB#G which respectively manage the macro cells #A to #G are accommodated in one or more exchanges MB, and the one or more exchanges MME and a radio base station HeNB#a which manages the home cell #a are accommodated in an IMS.

Figures 8, 9:
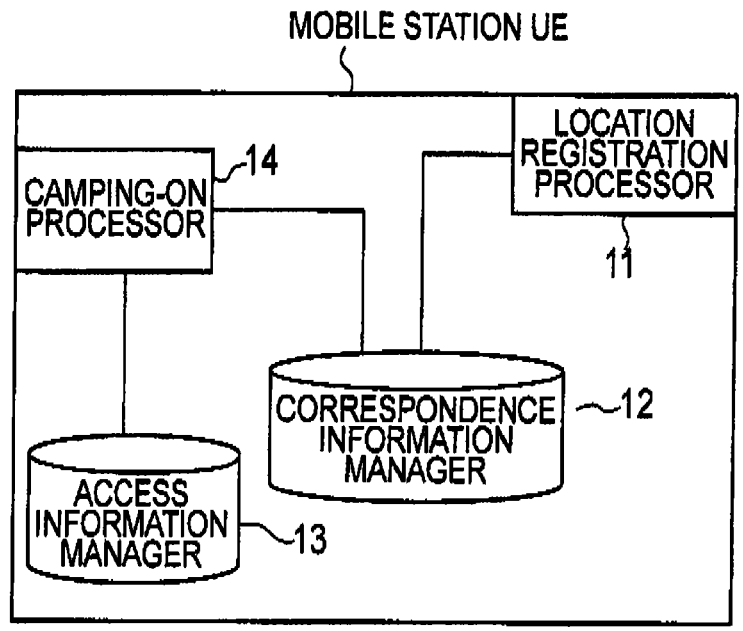
FIG. 8 is a functional block diagram of a mobile station according to the first embodiment of the present invention.
FIG. 9 is a diagram showing an example of correspondence information managed by the mobile station according to the first embodiment of the present invention.

As shown in FIG. 8, the mobile station UE according to the present embodiment includes a location registration processor 11, a correspondence information manager 12, an access information manager 13, and a camping-on processor 14.

The location registration processor 11 is configured to perform location registration processing (attachment processing) in such a case where a power supply is turned on, where the mobile station UE moves into a new location registration area, or where a period timer expires.

Also, the location registration processor 11 is configured to perform processing of registering its location at the home cell #a in the case where the camping-on cell is switched from the macro cell #A to the home cell #a.

The correspondence information manager 12 is configured to manage the macro cell (parent macro cell) #A and the home cell #a by associating the macro cell #A and the home cell #a with each other as shown in FIG. 9.

The access information manager 13 is configured to manage a home cell (e.g., home cell #a) which the mobile station UE is authorized to access.

Although the correspondence information manager 12 and the access information manager 13 are independently provided in the example in FIG. 8, the correspondence information manager 12 may include a function of the access information manager 13, and may be configured to mange the macro cell (parent macro cell) #A and the home cell #a which the mobile station UE is authorized to access by associating the macro cell #A and the home cell #a with each other.

Also, the correspondence information manager 12 may be configured to manage the macro cell #A and the home cell #a by associating the macro cell #A and the home cell #a with each other based on the information notified by the network apparatus at the time of location registration processing or call connection processing.

In this respect, the network apparatus (for example, an exchange MME, a radio control device RNC, or the like), transmits the information indicating the corresponding relationship between the macro cell #A and the home cell #a as the above-mentioned information.

The camping-on processor 14 is configured to determine, upon receipt of the broadcast information from the macro cell #A, whether or not to start performing camp-on in the home cell #a according to a comparison result between the radio quality of the camping-on cell and the radio quality of the home cell #a which is managed while being associated with the macro cell #A.

Specifically, the camping-on processor 14 is configured to start performing camp-on in the home cell #a in the case where the sum of an offset value included in the received broadcast information and the radio quality of the home cell #a exceeds the radio quality of the macro cell #A. Such an offset value may be previously stored in the mobile station UE.

On the other hand, the camping-on processor 14 is configured not to start cell search processing of searching for a home cell while the mobile station UE is being in a cell which does not correspond to one of the macro cells (parent macro cells) managed by the correspondence information manager 12, that is, configured not to measure the radio quality of the home cell.

Also, in a case where the camping-on processor 14 repeats changing the camping-on cell and needs to perform camp-on in the macro cell #A, the camping-on processor 14 performs cell search processing for the home cell #a corresponding to the macro cell #A, that is to say, the camping-on processor 14 starts measurement of the radio quality of the home cell #a corresponding to the macro cell #A.

Also, the broadcast information of the macro cell #A may include an offset value (for the same frequency, a different frequency, a different system, and the like) for prompting active observation of the home cell #a. In such a case, a carrier can prompt the mobile station UE performing camp-on in the macro cell #A to actively use the home cell #a, according to the radio quality state, the congestion state, or the like in the macro cell #A.

The camping-on processor 14 may be configured to be activated and to start searching for and perform camp-on in the home cell #a in the case where a primary scrambling code, a PCI, or a frequency for the home cell #a is notified by the broadcast information from the macro cell #A.

(Operation of Mobile Communication System according to First Embodiment of Present Invention)

An operation of a mobile communication system according to the first embodiment of the present invention, specifically, an operation of the mobile station UE is described with reference to FIG. 10.

Figure 10:
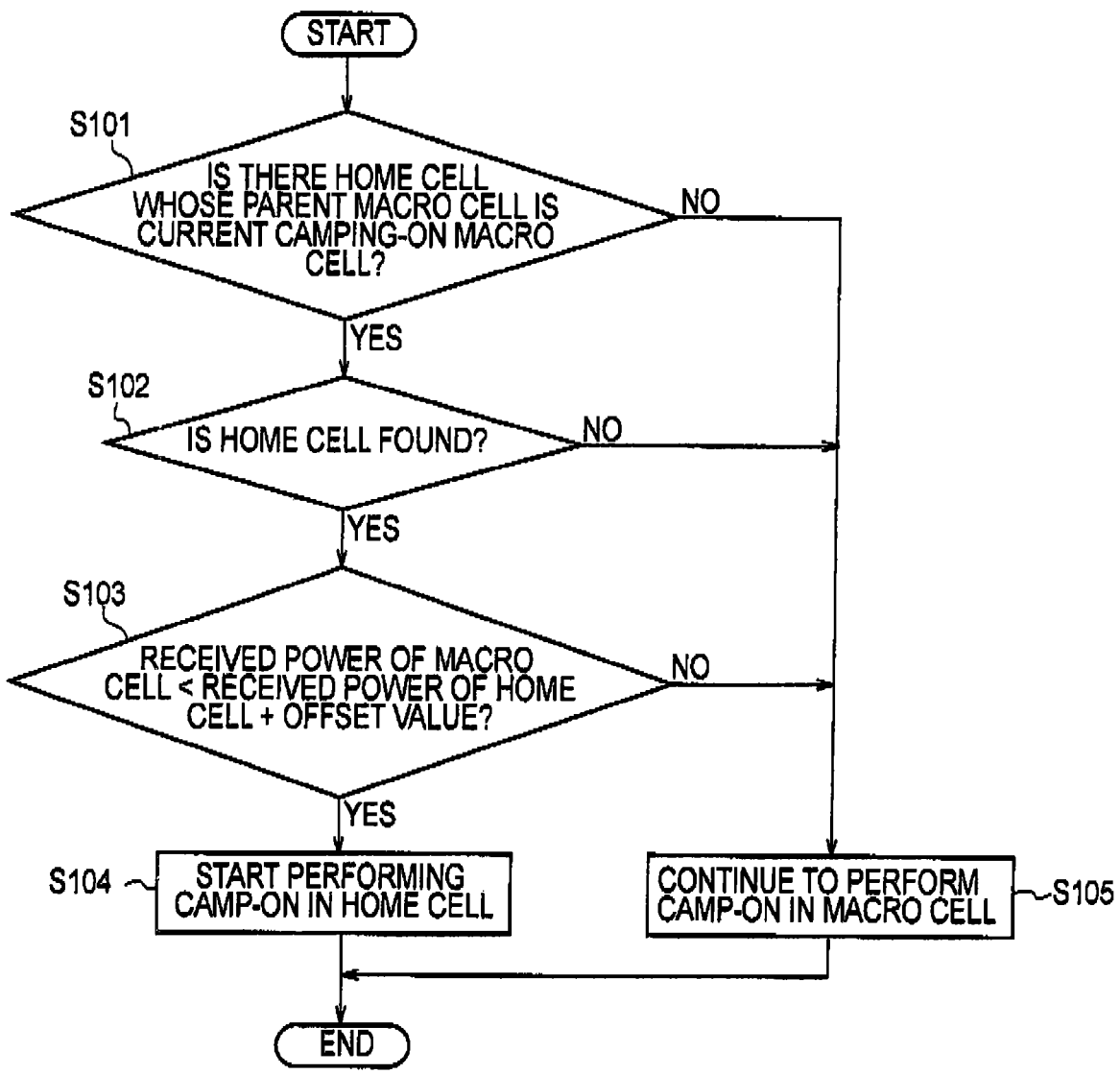
FIG. 10 is a flowchart showing an operation of the mobile station according to the first embodiment of the present invention.

As shown in FIG. 10, in step S101, the mobile station LIE refers to the correspondence information manager 12 and determines whether or not there is a home cell whose parent macro cell is the current camping-on cell (macro cell).

In the case where it is determined that no such cell exists, the process proceeds to step S105 where the mobile station UE continues to perform camp-on in the current camping-on cell.

On the other hand, in the case where it is determined that such cell exists, the mobile station UE tries to receive a pilot signal in the above-described home cell in step S102.

In the case where the mobile station UE fails to receive the pilot signal, or fails to find the pilot signal, the process proceeds to step S105, and the mobile station UE continues to perform camp-on in the current camping-on cell Meanwhile, in the case where the mobile station UE succeeds to receive the pilot signal, or fails to find the pilot signal, the mobile station UE determines in step S103 whether it is satisfied that "the radio quality in the macro cell (received power of the pilot signal)≤the radio quality of the home cell (received power of the pilot signal)+the offset value".

In the case where the above-mentioned relationship is determined not to be satisfied, the process proceeds to step S105 where the mobile station UE continues to perform camp-on in the current camping-on cell.

On the other hand, in the case where the above-mentioned relationship is determined to be satisfied, the mobile station UE starts performing camp-on in the home cell in step S104.

(Advantageous Effects of Mobile Communication System according to First Embodiment of Present invention)

In the mobile communication system according to the first embodiment of the present invention, the mobile station UE is configured not to start cell search processing for the home cell while the mobile station UE is being in the macro cells #B to #F, i.e., not to measure the radio quality of the home cell. For this reason, suppression of the power consumption otherwise caused by redundant cell search processing is expected.

In addition, in the mobile communication system according to the first embodiment of the present invention, the home cell #a does not have to be included in the information indicating neighboring cells, in the broadcast information of the macro cell #A. Thus the size of the broadcast information of the macro cell #A can be reduced even in the case where a large number of home cells which different sets of mobile stations are respectively authorized to access are installed in the macro cell #A.

(Modifications)

Note that operation of the above described mobile station UE, the radio base station (macro cell radio base station or femto cell radio base station) NodeB, eNB or the network device 10 may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE. Also, the storage medium and the processor may be provided in the mobile station UE as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile station comprising:
circuitry configured to
associate a macro cell with a home cell, when the mobile station manages the home cell to which the mobile station is authorized to access; and
determine whether or not to perform camp-on in the home cell according to a comparison result between a radio quality of the home cell which is managed in association with the macro cell and a radio quality in the macro cell, when the mobile station is located in the macro cell managed by the circuitry and receiving a broadcast information from the macro cell,
wherein the circuitry is configured to only start the home cell searching and to measure a radio quality of the home cell while the mobile station is located in the macro cell managed in association with the home cell by the circuitry, and
wherein the circuitry is configured to not start cell search processing of searching for the home cell and to not measure a radio quality of the home cell while the mobile station is not located in the macro cell managed in association with the home cell by the circuitry.

2. The mobile station according to claim 1, wherein the circuitry is configured to start performing camp-on in the home cell in a case where a sum of an offset value included in the received broadcast information and the radio quality of the home cell exceeds the radio quality in the macro cell.

3. The mobile station according to claim 1, wherein the circuitry manages the macro cell and the home cell in association with each other based on information notified by a network apparatus at a time of location registration processing or call connection processing.

4. The mobile station according to claim 1, wherein the circuitry starts searching for and performing camp-on in the home cell in a case where the mobile station is notified of a primary scrambling code, a PCI, or a frequency for the home cell by the broadcast information from the macro cell.

5. The mobile station according to claim 1, wherein the home cell is located in a same coverage area as the macro cell.

6. A camping-on method in a mobile station, the method comprising:
associating, by circuitry of the mobile station, a macro cell with a home cell, when the mobile station manages the home cell to which the mobile station is authorized to access;
determining, by the circuitry of the mobile station, whether or not to perform camp-on in the home cell according to a comparison result between a radio quality of the home cell which is managed in association with the macro cell and a radio quality in the macro cell, when the mobile station is located in the macro cell managed by the circuitry and receiving a broadcast information from the macro cell,
only starting the home cell searching and measuring a radio quality of the home cell while the mobile station is located in the macro cell managed in association with the home cell by the circuitry; and
not starting cell search processing of searching for the home cell and not measuring a radio quality of the home cell while the mobile station is not located in the macro cell managed in association with the home cell by the circuitry.

7. The camping-on method according to claim 6, wherein in the determining, the mobile station starts performing camp-on in the home cell in a case where a sum of an offset value included in the received broadcast information and the radio quality in the home cell exceeds the radio quality of the macro cell.

8. The camping-on method according to claim 6, comprising the step of managing the macro cell and the home cell in association with each other by the mobile station based on information notified by a network apparatus at a time of location registration processing or call connection processing.

9. The camping-on method according to claim 6, comprising the step of starting searching for and performing camp-on in the home cell by the mobile station in a case where the mobile station is notified of a primary scrambling code, a PCI, or a frequency for the home cell by the broadcast information from the macro cell.

* * * * *